(12) United States Patent
Lee et al.

(10) Patent No.: US 11,552,431 B2
(45) Date of Patent: Jan. 10, 2023

(54) INPUT/OUTPUT TERMINAL AND ELECTRONIC DEVICE COMPRISING SAME

(71) Applicant: SAMSUNG ELECTRONICS CO., LTD., Suwon-si (KR)

(72) Inventors: Jinseock Lee, Suwon-si (KR); Jaesub Youn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/265,703

(22) PCT Filed: Sep. 3, 2019

(86) PCT No.: PCT/KR2019/011313
§ 371 (c)(1),
(2) Date: Feb. 3, 2021

(87) PCT Pub. No.: WO2020/050581
PCT Pub. Date: Mar. 12, 2020

(65) Prior Publication Data
US 2021/0184402 A1 Jun. 17, 2021

(30) Foreign Application Priority Data
Sep. 3, 2018 (KR) .................. 10-2018-0104726

(51) Int. Cl.
*H01R 13/648* (2006.01)
*G06F 13/40* (2006.01)
(Continued)

(52) U.S. Cl.
CPC ..... *H01R 13/6485* (2013.01); *G06F 13/4081* (2013.01); *H01R 13/03* (2013.01); *H01R 13/2471* (2013.01); *H01R 13/652* (2013.01)

(58) Field of Classification Search
CPC ............... H01R 13/6485; H01R 13/03; H01R 13/2471; H01R 13/652; H01R 13/7033;
(Continued)

(56) References Cited

U.S. PATENT DOCUMENTS 6,102,742 A * 8/2000 Daly .................. H01R 13/6616
338/21
6,246,012 B1 * 6/2001 Wallace ................ H01R 12/58
174/117 F
(Continued)

FOREIGN PATENT DOCUMENTS

CN 101465490 6/2009
CN 207052868 2/2018
(Continued)

OTHER PUBLICATIONS

Extended Search Report dated Aug. 26, 2021 in counterpart European Patent Application No. 19857076.4.
(Continued)

*Primary Examiner* — Travis S Chambers
(74) *Attorney, Agent, or Firm* — Nixon & Vanderhye, P.C.

(57) ABSTRACT

Disclosed are an input/output terminal for connecting an electronic device to an external device and an electronic device comprising the input/output terminal, the input/output terminal comprising: a signal pin allowing signals to be transmitted/received between the electronic device and the external device; a ground pin connected to a ground part of the electronic device; and a resistant material disposed at the end part of the signal pin or the ground pin. Other various embodiments are possible.

8 Claims, 6 Drawing Sheets

(51) Int. Cl.
*H01R 13/24* (2006.01)
*H01R 13/652* (2006.01)
*H01R 13/03* (2006.01)

(58) Field of Classification Search
CPC ............... H01R 13/2464; H01R 13/26; H01R 13/6616; H01R 13/2442; H01R 4/66; G06F 13/4081
See application file for complete search history.

(56) References Cited

U.S. PATENT DOCUMENTS

| | | | | |
|---|---|---|---|---|
| 6,296,499 | B1* | 10/2001 | Hermann, Jr. | ......... H01R 13/03 439/181 |
| 6,790,097 | B1 | 9/2004 | Edwards et al. | |
| 7,351,083 | B2 | 4/2008 | Biddle et al. | |
| 7,854,992 | B2* | 12/2010 | Fu | ............... H01R 4/04 428/408 |
| 9,583,884 | B1* | 2/2017 | Wang | ......... H01R 13/03 |
| 10,446,975 | B1* | 10/2019 | Johnson | ......... H01R 13/112 |
| 2011/0028012 | A1* | 2/2011 | Chien | ......... H01R 13/6616 439/181 |
| 2012/0252270 | A1* | 10/2012 | Lee | ......... H01R 12/7088 439/607.01 |
| 2014/0063678 | A1* | 3/2014 | Yoo | ......... H01R 13/6485 361/220 |
| 2018/0013238 | A1 | 1/2018 | Park et al. | |
| 2018/0183184 | A1* | 6/2018 | Tsai | ......... H01R 13/5025 |

FOREIGN PATENT DOCUMENTS

| | | |
|---|---|---|
| EP | 0 949 715 | 10/1999 |
| JP | 2001-093625 | 4/2001 |
| JP | 2008-226786 | 9/2008 |
| JP | 2009-146780 | 7/2009 |
| JP | 2011-171036 | 9/2011 |
| KR | 10-2014-0028953 | 3/2014 |
| WO | 2014/107156 | 7/2014 |

OTHER PUBLICATIONS

"Polymer Hot Plug Device", IBM Technical Disclosure Bulletin, vol. 32, No. 2, Jul. 1, 1989, p. 307/308.
International Search Report for PCT/KR2019/011313 dated Dec. 11, 2019, 4 pages.
Written Opinion of the ISA for PCT/KR2019/011313 dated Dec. 11, 2019, 4 pages.
Notification of First Office Action dated Dec. 22, 2021 in counterpart Chinese Patent Application No. 201980057189.9 and English-language translation.
Notification of a Decision to Grant a Patent dated Jun. 13, 2022 in counterpart CN Application No. 201980057189.9 and English-language translation.

* cited by examiner

INPUT/OUTPUT TERMINAL AND ELECTRONIC DEVICE COMPRISING SAME

This application is the U.S. national phase of International Application No. PCT/KR2019/011313 filed Sep. 3, 2019 which designated the U.S. and claims priority to KR Patent Application No. 10-2018-0104726 filed Sep. 3, 2018, the entire contents of each of which are hereby incorporated by reference.

FIELD

The disclosure relates to an input/output terminal for connecting an external device to an electronic device, and relates to the input/output terminal capable of protecting the electronic device from an electric shock occurring in a process of connecting the electronic device and the external device.

DESCRIPTION OF RELATED ART

An electronic device has an input/output terminal for connection with an external device. Depending on design specifications of the electronic device, one or more input/output terminals may exist. Due to a difference in electrostatic potential between the external device and the electronic device, electric shocks including electrostatic discharge which occurs when the external device is connected to the electronic device through the input/output terminal may be transferred to the electronic device. Such electrostatic discharge may affect internal components and operations of the electronic device, and a method of disposing a separate circuit or the like may be used to minimize such an effect.

SUMMARY

An input/output terminal is provided to prevent internal components of an electronic device from being damaged due to electric shocks such as electrostatic discharge, to minimize the quality deterioration of a signal transmitted or received between an electronic device and an external device, and to have a simple structure and low manufacturing cost.

An input/output terminal according to an embodiment of the disclosure may include a signal pin transmitting/receiving a signal between the electronic device and the external device, a ground pin connected to a ground part of the electronic device, and a resistive material disposed at an end portion of the signal pin or the ground pin.

An electronic device according to an embodiment of the disclosure may include at least one input/output terminal for connection with an external device, and a controller controlling signal transmission/reception with the external device through the input/output terminal, wherein the input/output terminal may include a signal pin transmitting/receiving a signal with the external device, a ground pin connected to a ground part, and a resistive material disposed at an end portion of the signal pin or the ground pin.

The input/output terminal according to an embodiment of the disclosure can consume and remove electric shocks that may be transferred to the electronic device in a process that the electronic device is connected to the external device. After the electronic device and the external device are completely connected, the resistive material is removed from a transmission/reception circuit between the electronic device and the external device so as not to affect transmission/reception signals.

DETAILED DESCRIPTION OF EXAMPLE EMBODIMENTS

Figure 1:
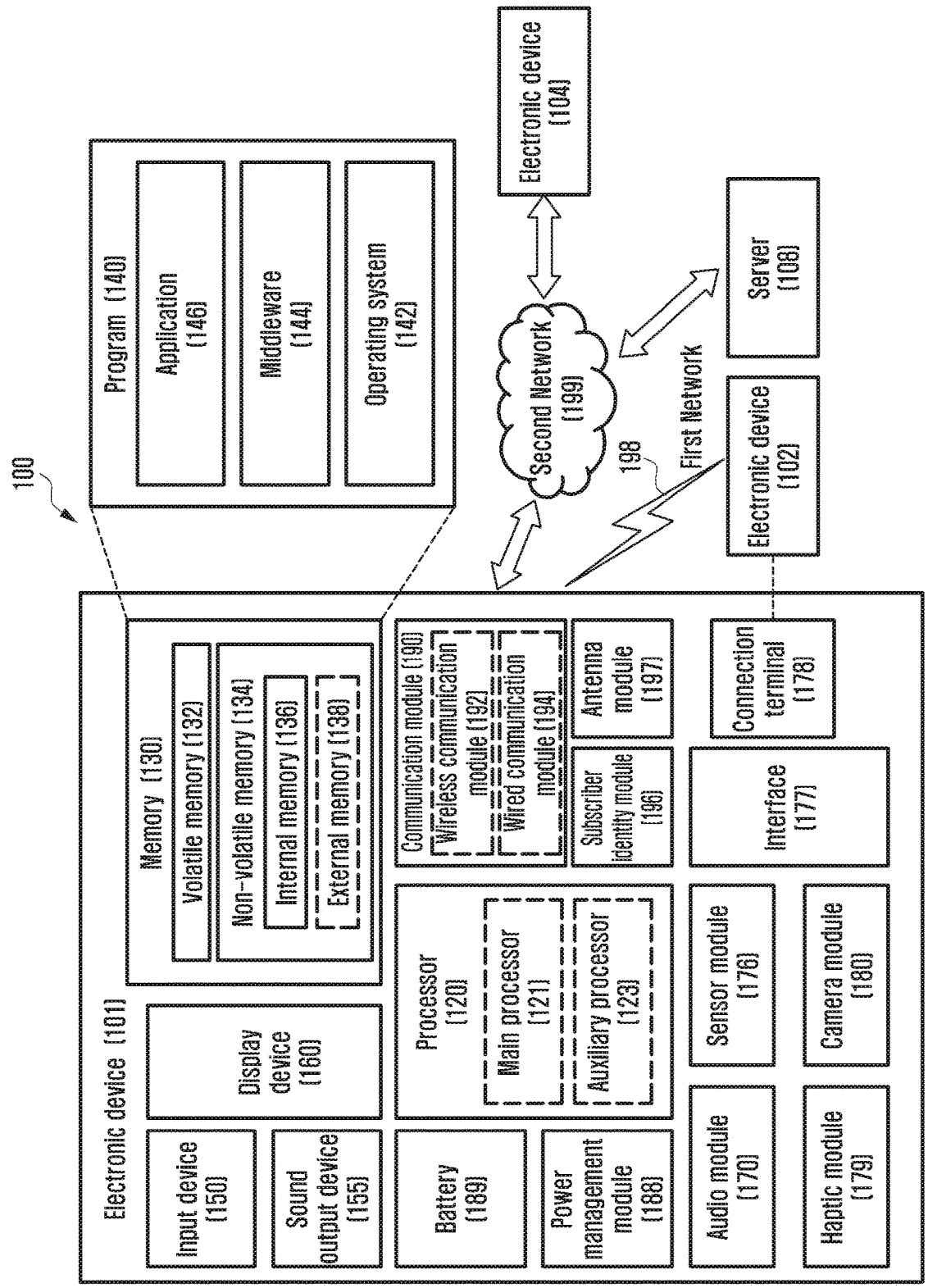
FIG. 1 is a block diagram illustrating an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
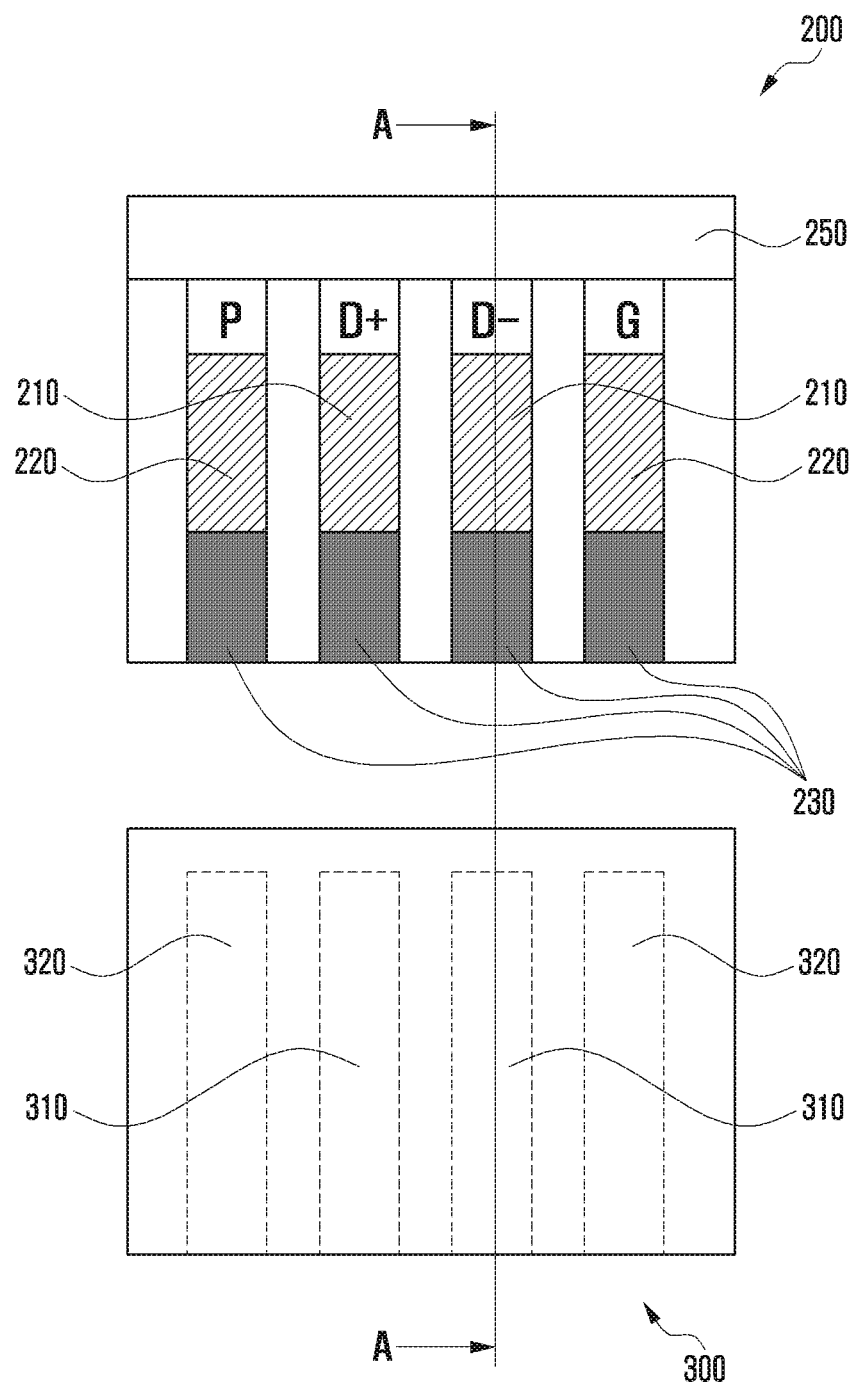
FIG. 2 is a diagram conceptually illustrating an input/output terminal according to an embodiment of the disclosure.

FIG. 2 is a diagram conceptually illustrating an input/output terminal 200 according to an embodiment of the disclosure.

The input/output terminal 200 according to an embodiment of the disclosure may include a signal pin 210, a ground pin 220, a resistive material 230, a pin fixing part (not shown), and an external housing (not shown).

The pin fixing part (not shown) according to an embodiment of the disclosure may fix the signal pin 210 and the ground pin 220 of the input/output terminal 200 and also stably maintain a connected state with a circuit board 250. The pin fixing part may fix the signal pin 210 and the ground pin 220 to their positions while connection with and disconnection from the external device 300 are repeated through the input/output terminal 200.

The external housing (not shown) according to an embodiment of the disclosure accommodates the signal pin 210, the ground pin 220, the resistive material 230, and the pin fixing part, and also form an external frame of the input/output terminal 200. The external housing is a box-like shape in which the signal pin 210, the ground pin 220, the resistive material 230, and the pin fixing part are built in. The external housing may have one opened surface and expose the signal pin 210 and the ground pin 220 through the opened surface. The external device 300 may be connected with or disconnected from the electronic device by being inserted into or removed from the opened surface of the external housing. In a process that the external device 300 is connected with the electronic device, the external housing may guide a signal pin 310 and a ground pin 320 of the external device 300 to the corresponding signal pin 210 and the corresponding ground pin 220 of the input/output terminal 200 so as to assist proper connection without mismatch. The external housing may be formed of a material having a certain strength and durability so as not to be damaged during repeated connection and disconnection of the external device 300 and the electronic device. For example, it may be formed of a metallic material such as stainless steel.

The pin fixing part and the external housing described above are omitted from the drawings for convenience of explanation and to aid understanding of the disclosure.

In the signal pin 210 according to an embodiment of the disclosure, one side 211 is connected to the electronic device through an intermediate medium such as the circuit board 250, and the other side 213 extended from the one side 211 may be exposed to be connected to the external device 300.

In an embodiment of the disclosure, the one side of the signal pin 210 may be connected to a controller of the electronic device through the circuit board 250 used as an intermediate medium. Although described using, for example, the circuit board 250, the intermediate medium is not limited thereto and may alternatively use any other component capable of electrically connecting the controller of the electronic device and the signal pin 210.

In an embodiment of the disclosure, the other side 213 of the signal pin 210 may be formed to extend from the one side 211 to an open portion of the external housing. An end portion of the other side 213 of the signal pin 210 may first contact the signal pin 310 of the external device 300 during the connection with the external device 300, and transmit/receive a signal while maintaining the contact with the signal pin 310 of the external device 300.

The controller (not shown) according to an embodiment of the disclosure may process a signal received from the external device 300 through the input/output terminal 200 or transmit a signal to the external device 300 through the input/output terminal 200. The controller may refer to a separate chipset of processing a signal transmitted or received through the input/output terminal 200, or may include a processor such as a CPU or an AP that performs together the overall control of the electronic device.

In the ground pin 220 according to an embodiment of the disclosure, one side 211 is connected to a ground part of the electronic device through an intermediate medium such as the circuit board 250, and the other side 213 extended from the one side 211 may be exposed to be connected to the external device 300.

In an embodiment of the disclosure, the one side 211 of the ground pin 220 may be connected to the ground part of the electronic device through the circuit board 250 used as an intermediate medium. Although described using, for example, the circuit board 250 as in the signal pin 210, the intermediate medium is not limited thereto and may alternatively use any other component capable of electrically connecting the ground part of the electronic device and the ground pin 210.

In an embodiment of the disclosure, the other side 213 of the ground pin 220 may be formed to extend from the one side 211 to an open portion of the external housing. An end portion of the other side 213 of the ground pin 220 may first contact the ground pin 320 of the external device 300 during the connection with the external device 300, and supply power while maintaining the contact with the ground pin 320 of the external device 300.

In an embodiment of the disclosure, FIG. 2 shows an example of the input/output terminal 200 composed of two signal pins 210 and two ground pins 220. However, the number of the signal pins 210 and the ground pins 220 is not limited thereto, and may be increased or decreased depending on the type of the input/output terminal 200.

The input/output terminal 200 according to an embodiment of the disclosure may include various types of pin-connectable input/output terminals such as a USB terminal, a micro USB terminal, and an HDMI terminal, but the USB terminal is described as an example to aid understanding of the disclosure.

The resistive material 230 according to an embodiment of the disclosure may be disposed at the end portion of the other side 213 of the signal pin 210 or the signal pin 210 and the ground pin 220. The resistive material 230 may first contact the signal pin 310 or the ground pin 320 of the external device 300 in a process that the external device 300 is connected to the input/output terminal 200. In case where the external device 300 is connected to the input/output terminal 200, an unexpected electric shock may be applied to the electronic device through the input/output terminal 200.

For example, if an electrical overstress (EOS) caused by power of the external device 300 or an electrostatic discharge (ESD) caused by static electricity accumulated in the external device 300 is transferred to the electronic device through the signal pin 210 or the ground pin 220, various electronic components of the electronic device may be damaged or malfunction.

The resistive material 230 according to an embodiment of the disclosure may absorb and consume EOS and ESD shocks being transferred from the external device 300 to block transference to the electronic device.

According to an embodiment of the disclosure, the signal pin 210 and the ground pin 220 may have the same length. Because EOS and ESD shocks that may be transferred during the connection process of the external device 300 are absorbed or consumed by the resistive material 230 and thereby not transferred to the ground part of the electronic device, an additional component other than the signal pin 210 and the ground pin 220 is unnecessary. Thus, it is possible to form the signal pin 210 and the ground pin 220 to have the same length.

The resistive material 230 according to an embodiment of the disclosure may be prepared by combining carbon powder or carbon fiber with polymer, and a resistance value may be adjusted by adjusting a combination ratio between carbon powder or carbon fiber and polymer.

Examples of polymer include acrylonitrile butadiene styrene (ABS), acetal, polycarbonate, polypropylene, polyvinylidene fluoride, or ultra-high-molecular-weight polyethylene.

The resistance value of the resistive material 230 according to an embodiment of the disclosure may be preferably formed within a range of $10^6$ to $10^{12}\Omega$.

Figure 3A:
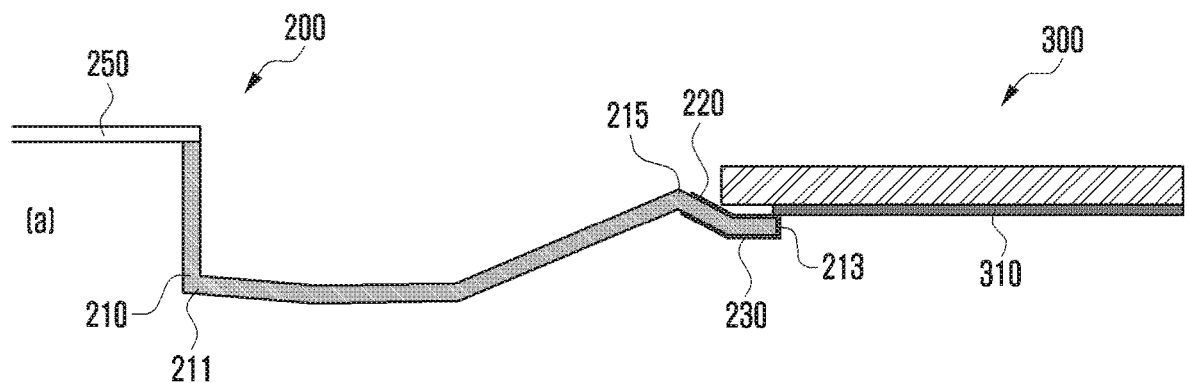
FIGS. 3A, 3B, and 3C are diagrams conceptually illustrating a signal pin or a ground pin of an input/output terminal according to an embodiment of the disclosure.
Figure 3B:
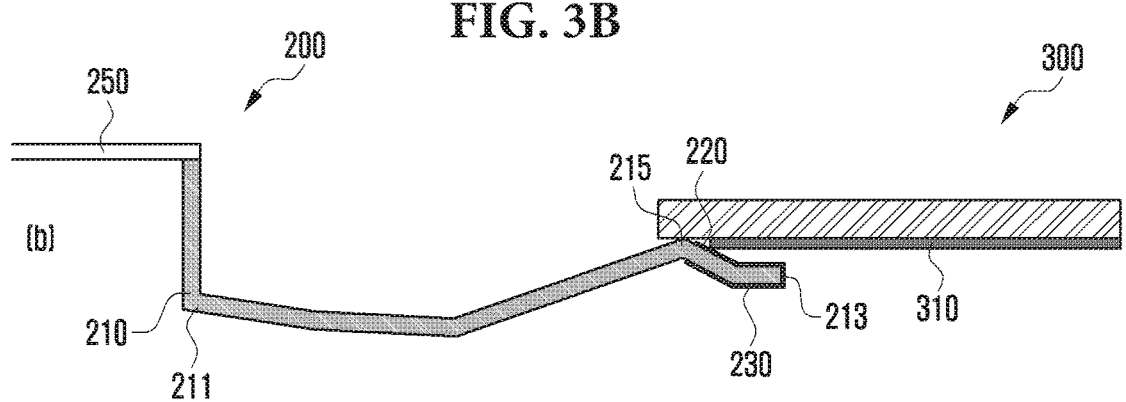
Figure 3C:
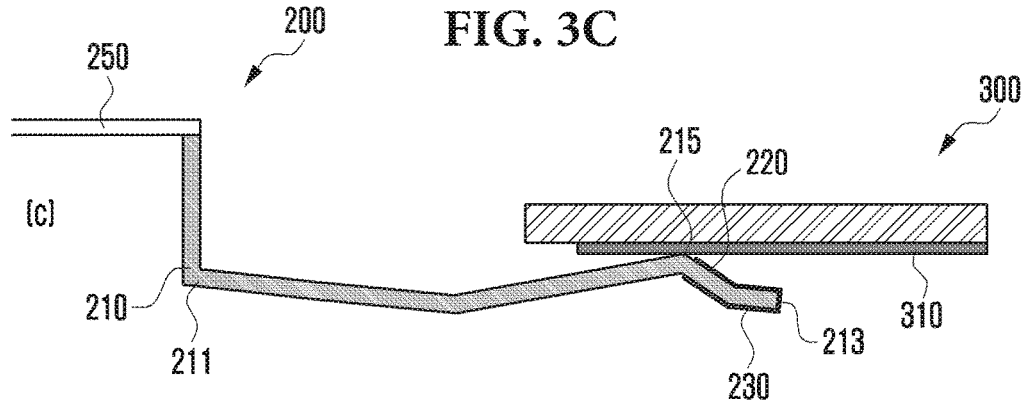

FIGS. 3A to 3C are diagrams conceptually illustrating a signal pin 210 or a ground pin 220 of an input/output terminal 200 according to an embodiment of the disclosure, while showing a cross-section taken along line A-A of FIG. 2.

In FIGS. 3A to 3C, a cross-section of the signal pin 210 of FIG. 2 is described as an example, but the ground pin 220 may also be formed in the same shape. One side of the signal pin 210 may be connected to the controller in the electronic device through the circuit board 250 as an intermediate medium.

The signal pin 210 according to an embodiment of the disclosure is formed to extend from one side 211 connected to the circuit board 250 to contact the signal pin 310 of the external device 300, and also formed such that the end portion of the other side 213 first contacts the signal pin 310 of the external device 300. The signal pin 210 may have at least one bent portion 215 formed between the one side 211 and the other side 213. The bent portion 215 may be formed through deformation of the signal pin 210 itself, or may have a form that a separate structure is attached or connected. The bent portion 215 may be formed to protrude in a contact direction with the signal pin 310 of the external device 300, and may press the signal pin 310 of the external device 300 to maintain a contact state between the signal pin 210 of the input/output terminal 200 and the signal pin 310 of the external device 300.

According to an embodiment of the disclosure, the resistive material 230 may be disposed from the bent portion 215 of the signal pin 210 up to the end portion of the other side 213 of the signal pin 210. The resistive material 230 may be formed on the entire surface of the end portion of the other side 213 of the signal pin 210. For example, dipping the end portion of the other side 213 of the signal pin 210 in a liquefied resistive material 230 makes it possible to form the resistive material 230 on the entire surface of the end portion of the other side of the signal pin 210.

Because the resistive material 230 according to an embodiment of the disclosure is not formed by changing the structure of the signal pin 210 itself or adding an additional structure, the resistive material 230 may be formed on both the signal pin 210 and the ground pin 220 while occupying the same length of the signal pin 210 and the ground pin 220. Thus, it is not necessary to produce the signal pin 210 and the ground pin 220 in different shapes. In addition, because the shapes of the signal pin 210 and the ground pin 220 are not complicated, the production cost may be reduced.

FIGS. 3A to 3C sequentially show a process in which the signal pin 310 or the ground pin 320 of the external device 300 contacts the signal pin 210 or the ground pin 220 of the input/output terminal 200.

FIG. 3A shows a state in which the external device 300 starts to be inserted into the input/output terminal 200 according to an embodiment of the disclosure. In the insertion process of the external device 300, the signal pin 310 of the external device 300 may first contact the resistive material 230 formed at the end portion of the other side 213 of the signal pin 210 of the input/output terminal 200 as shown in FIG. 3B. During this process, ESD and EOS shocks that may be transferred from the external device 300 are absorbed or consumed by the resistive material 230 and thereby not transferred to the electronic device.

FIG. 3C shows a state in which the signal pin 310 of the external device 300 starts to contact the bent portion 215 of the signal pin 210 of the input/output terminal 200. From this point on, the resistive material 230 may or may not contact the signal pin 310 of the external device 300.

In case that the resistive material 230 according to an embodiment of the disclosure does not contact the signal pin 310 of the external device 300, the resistive material 230 does not intervene in a signal transmission/reception path between the external device 300 and the electronic device. Accordingly, the signal transmitted or received between the external device 300 and the electronic device may not be distorted or may not cause noise.

In addition, even if the resistive material 230 is in contact with the signal pin 310 of the external device 300, contact between the signal pin 210 of the input/output terminal 200 and the signal pin 310 of the external device 300 is made together. Thus, the signal transmitted or received between the external device 300 and the electronic device does not pass through the resistive material 230, but directly passes through the signal pin 210 of the input/output terminal 200 and the signal pin 310 of the external device 300. As a result, the signal transmitted or received between the external device 300 and the electronic device may not be affected.

Figure 4A:
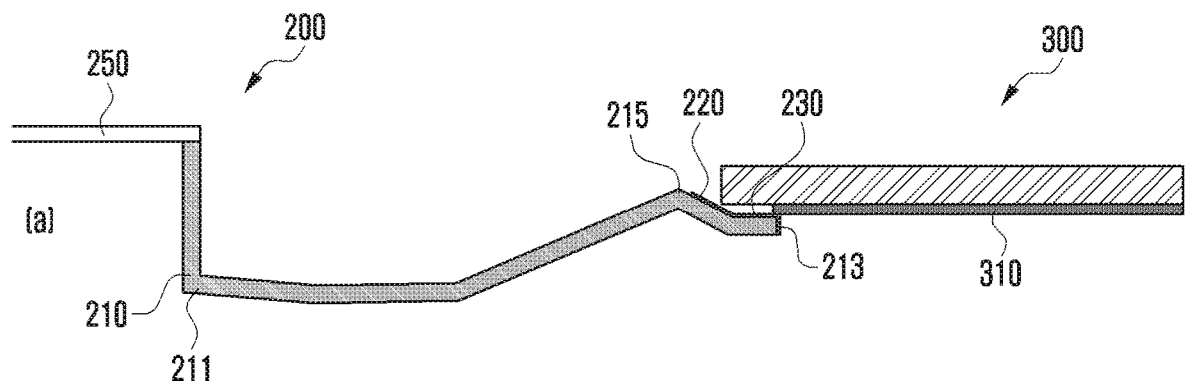
FIGS. 4A, 4B, and 4C are diagrams conceptually showing a signal pin or a ground pin of an input/output terminal according to another embodiment of the disclosure.
Figure 4B:
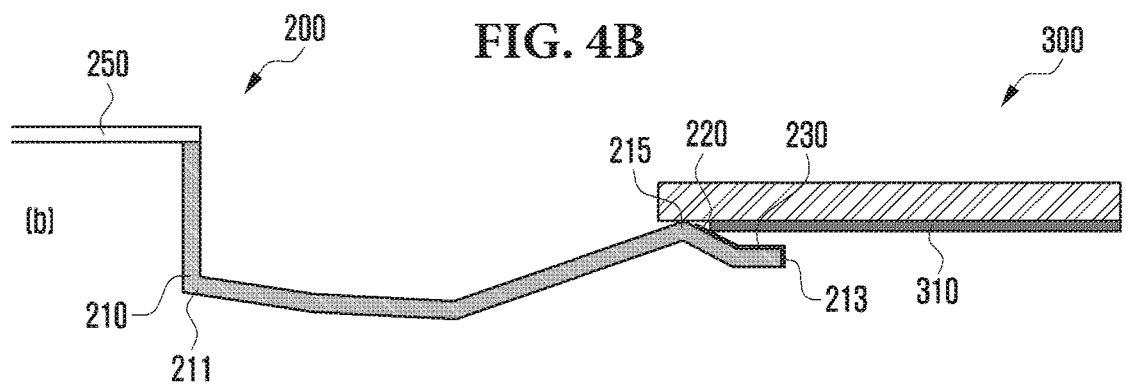
Figure 4C:
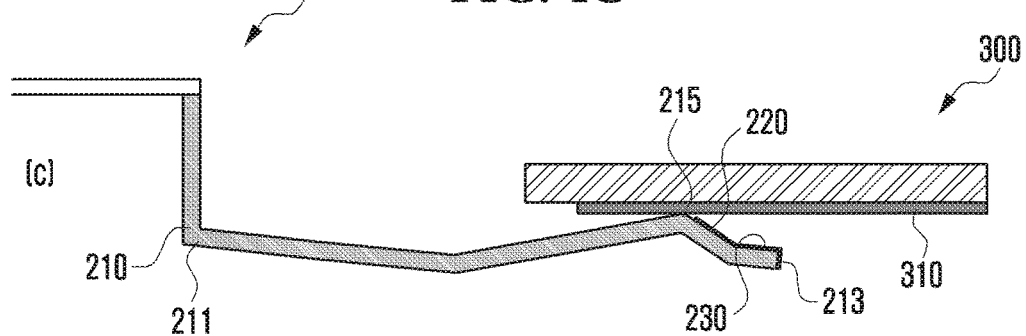

FIGS. 4A to 4C are diagrams conceptually showing a signal pin 210 or a ground pin 220 of an input/output terminal 200 according to another embodiment of the disclosure.

The shape of the signal pin 210 according to this embodiment may be the same as or similar to that in the embodiment of FIGS. 3A to 3C. However, there is a difference in a position where the resistive material 230 is disposed. That is, the resistive material 230 may be disposed only on the outermost surface of the other side 213 of the signal pin 210 and the contact surface with the signal pin 310 of the external device 300 among the end portion of the other side 213 of the signal pin 210. For example, applying the liquefied resistive material 230 onto the end portion of the other side 213 of the signal pin 210 makes it possible to form the resistive material 230.

Because the resistive material 230 is not formed by changing the structure of the signal pin 210 itself or adding an additional structure as in the embodiment of FIGS. 3A to 3C, the resistive material 230 may be formed on both the signal pin 210 and the ground pin 220 while occupying the same length of the signal pin 210 and the ground pin 220.

FIGS. 4A to 4C sequentially show a process in which the signal pin 310 or the ground pin 320 of the external device 300 contacts the signal pin 210 or the ground pin 220 of the input/output terminal 200.

FIG. 4A shows a state in which the external device 300 starts to be inserted into the input/output terminal 200 according to an embodiment of the disclosure. In the insertion process of the external device 300, the signal pin 310 of the external device 300 may first contact the resistive material 230 formed at the end portion of the other side 213 of the signal pin 210 of the input/output terminal 200 as shown in FIG. 4B. During this process, ESD and EOS shocks that may be transferred from the external device 300 are absorbed or consumed by the resistive material 230 and thereby not transferred to the electronic device.

FIG. 4C shows a state in which the signal pin 310 of the external device 300 starts to contact the bent portion 215 of the signal pin 210 of the input/output terminal 200. From this point on, the resistive material 230 may or may not contact the signal pin 310 of the external device 300.

In case that the resistive material 230 according to an embodiment of the disclosure does not contact the signal pin 310 of the external device 300, the resistive material 230 does not intervene in a signal transmission/reception path between the external device 300 and the electronic device. Accordingly, the signal transmitted or received between the external device 300 and the electronic device may not be distorted or may not cause noise.

In addition, even if the resistive material 230 is in contact with the signal pin 310 of the external device 300, contact between the signal pin 210 of the input/output terminal 200 and the signal pin 310 of the external device 300 is made together. Thus, the signal transmitted or received between the external device 300 and the electronic device does not pass through the resistive material 230, but directly passes through the signal pin 210 of the input/output terminal 200 and the signal pin 310 of the external device 300. As a result, the signal transmitted or received between the external device 300 and the electronic device may not be affected.

Figure 5B:
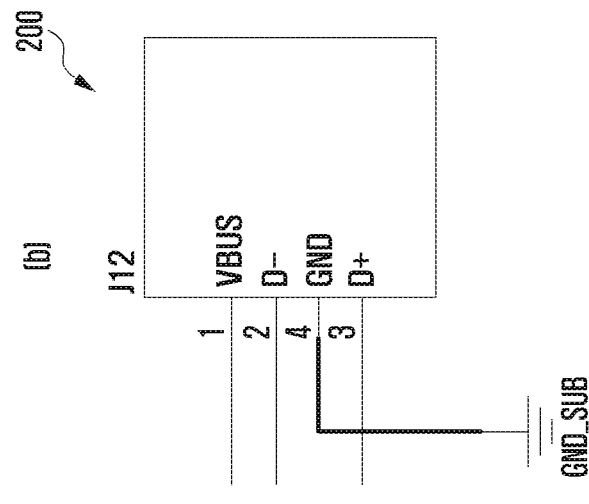
FIGS. 5A and 5B are diagrams illustrating a change in circuit configuration in a process that an external device is connected to an input/output terminal according to an embodiment of the disclosure.
Figure 5A:
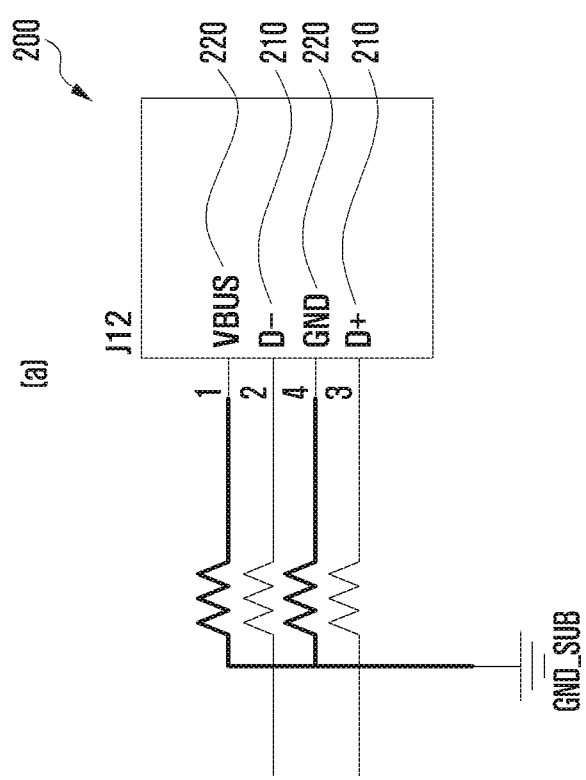

FIGS. 5A and 5B are diagrams illustrating a change in circuit configuration in a process that an external device 300 is connected to an input/output terminal 200 according to an embodiment of the disclosure.

FIG. 5A shows a state in which the signal pin 310 and the ground pin 320 of the external device 300 are in contact with the resistive material 230 as the external device 300 is inserted into the input/output terminal 200. FIG. 5B shows a state in which the signal pin 310 and the ground pin 320 of the external device 300 are in direct contact with the signal pin 210 and the ground pin 220 of the input/output terminal 200.

The state in which the signal pin 310 and the ground pin 320 of the external device 300 are in direct contact with the signal pin 210 and the ground pin 220 of the input/output terminal 200 may refer to a state in which the signal pin 310 and the ground pin 320 of the external device 300 are in contact only with the signal pin 210 and the ground pin 220 of the input/output terminal 200 or a state in which the resistive material 230 is also in contact.

The state in which the signal pin 310 and the ground pin 320 of the external device 300 are in contact only with the signal pin 210 and the ground pin 220 of the input/output terminal 200 may be identical with a state in which the resistive material 230 is actually removed in a transmission/reception circuit between the electronic device and the external device 300.

In the state where the signal pin 310 and the ground pin 320 of the external device 300 are in contact with the resistive material 230 as well as the signal pin 210 and the ground pin 220 of the input/output terminal 200, the same effect may occur as if the resistive material and a short-circuited line are connected in parallel. The short-circuited line refers to a portion where the signal pin 310 and the ground pin 320 of the external device 300 directly contact the signal pin 210 and the ground pin 220 of the input/output terminal 200. In this case, because a signal flows toward the short-circuited side with a low resistance, a circuit of the resistive material 230 is in an open state and thus may be identical with a state of being removed in a transmission/reception circuit with the external device 300.

As such, after the external device 300 is inserted into the input/output terminal 200, an effect occurs as if the resistive material 230 disappears in the transmission/reception circuit between the electronic device and the external device 300. Therefore, it does not affect transmission/reception signals.

Figure 6B:
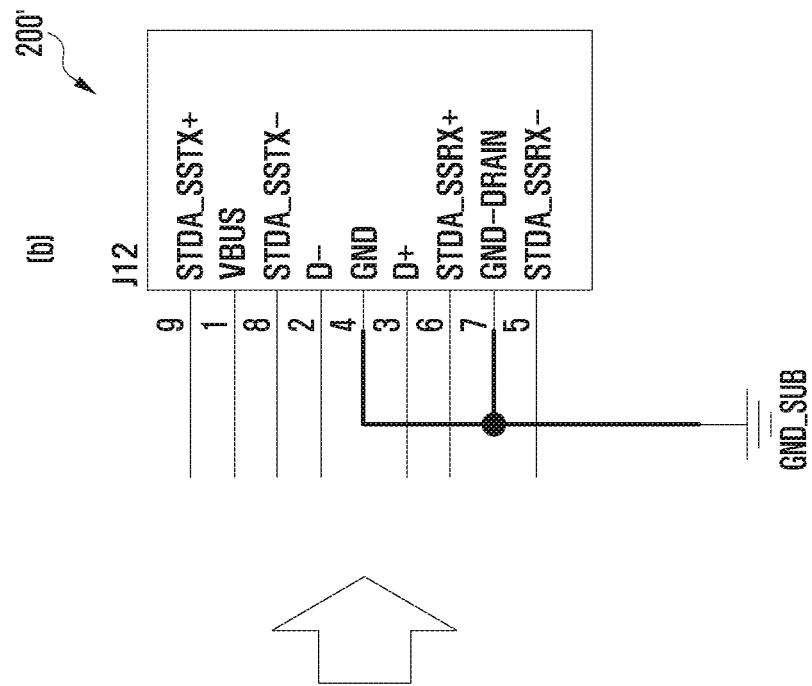
FIGS. 6A and 6B are diagrams illustrating a change in circuit configuration in a process that an external device is connected to an input/output terminal according to another embodiment of the disclosure.
Figure 6A:
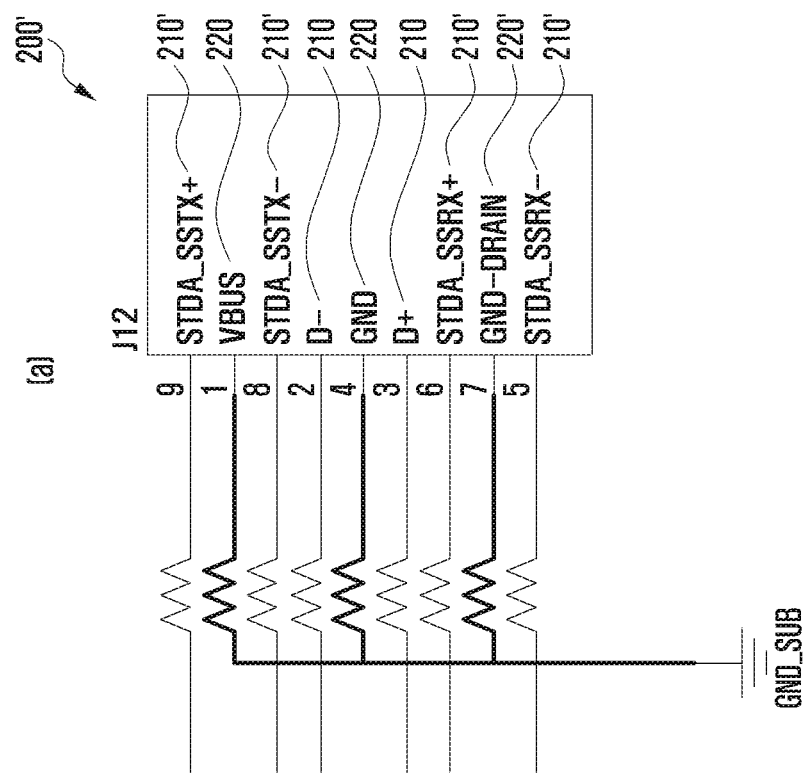

In FIGS. 5A and 5B, two signal pins 210 and two ground pins 220 are basically shown as an example. However, even if the type and number of pins including the signal pin 210 and the ground pin 220 are modified (210', 220') depending on various formats of the input/output terminals 200' as shown in FIGS. 6A and 6B, the same may be applied.

An input/output terminal according to an embodiment of the disclosure may include a signal pin transmitting/receiving a signal between the electronic device and the external device; a ground pin connected to a ground part of the electronic device; and a resistive material disposed at an end portion of the signal pin or the ground pin.

It may be characterized that the signal pin and the ground pin have same length.

It may be characterized that the signal pin or the ground pin has at least one bent portion formed from one side end portion to other side end portion, and the bent portion contacts a signal pin or a ground pin of the external device inserted into the input/output terminal.

It may be characterized that the resistive material is disposed in a section between the bent portion and the other side end portion of the signal pin or the ground pin.

It may be characterized that when the signal pin of the external device or the ground pin of the external device is inserted into the input/output terminal, the resistive material first contacts the signal pin of the external device or the ground pin of the external device.

It may be characterized that the resistive material is applied only to a surface in contact with a signal pin of the external device or a ground pin of the external device.

It may be characterized that the resistive material is disposed to surround entirely other side end portion of the signal pin or the ground pin.

It may be characterized that the resistive material is disposed at end portions of both the signal pin and the ground pin.

It may be characterized that the resistive material is formed by combining carbon powder or carbon fiber with polymer.

It may be characterized that a resistance value of the resistive material is within a range of $10^6$ to $10^{12}\Omega$.

An electronic device according to an embodiment of the disclosure may include at least one input/output terminal for connection with an external device; and a controller controlling signal transmission/reception with the external device through the input/output terminal, wherein the input/output terminal may include a signal pin transmitting/receiving a signal with the external device, a ground pin connected to a ground part, and a resistive material disposed at an end portion of the signal pin or the ground pin.

It may be characterized that the signal pin and the ground pin have same length.

It may be characterized that the signal pin or the ground pin has at least one bent portion formed from one side end portion to other side end portion, and the bent portion contacts a signal pin or a ground pin of the external device inserted into the input/output terminal.

It may be characterized that the resistive material is disposed in a section between the bent portion and the other side end portion of the signal pin or the ground pin.

It may be characterized that when the signal pin of the external device or the ground pin of the external device is inserted into the input/output terminal, the resistive material first contacts the signal pin of the external device or the ground pin of the external device.

It may be characterized that the resistive material is applied only to a surface in contact with a signal pin of the external device or a ground pin of the external device.

It may be characterized that the resistive material is disposed to surround entirely other side end portion of the signal pin or the ground pin.

It may be characterized that the resistive material is disposed at end portions of both the signal pin and the ground pin.

It may be characterized that the resistive material is formed by combining carbon powder or carbon fiber with polymer.

It may be characterized that a resistance value of the resistive material is within a range of $10^6$ to $10^{12}\Omega$.

What is claimed is:

1. An input/output terminal for connecting an electronic device to an external electronic device, the input/output terminal comprising:
    a signal pin configured for transmitting/receiving a signal between the electronic device and the external electronic device;
    a ground pin connected to a ground part of the electronic device; and
    a resistive material,
    wherein at least one of the signal pin or the ground pin includes a proximal end connected to the electronic device, a distal end opposite the proximal end, a first bent portion between the proximal end and the distal end, and a second bent portion between the first bent portion and the distal end, and
    wherein the first bent portion is formed to protrude in a contact direction between the at least one of the signal pin or the ground pin and a corresponding pin of the external electronic device for pressing contact against the corresponding pin when the external electronic device is connected to the electronic device, the second bent portion is formed to protrude in a direction opposite to the contact direction of the first bent portion, and the resistive material is disposed over an entirety of a portion of the at least one of the signal pin or the ground pin extending from between the first and second bent portions to the distal end.

2. The input/output terminal of claim 1, wherein the signal pin and the ground pin have same length.

3. The input/output terminal of claim 1, wherein the at least one of the signal pin or the ground pin is configured so that the resistive material first contacts the corresponding pin of the external electronic device as the external electronic device is connected to the electronic device.

4. The input/output terminal of claim 1, wherein the resistive material comprises carbon powder or carbon fiber and polymer.

5. The input/output terminal of claim 4, wherein a resistance value of the resistive material is within a range of 106 to 1012 Ω.

6. An electronic device comprising:
    at least one input/output terminal for connection with an external electronic device; and
    a controller configured to control signal transmission/reception with the external electronic device through the input/output terminal,
    wherein the input/output terminal includes:
        a signal pin configured for transmitting/receiving a signal with the external electronic device;
        a ground pin connected to a ground part; and
        a resistive material,
    wherein at least one of the signal pin or the ground pin includes a proximal end connected to the electronic device, a distal end opposite the proximal end, a first bent portion between the proximal end and the distal end, and a second bent portion between the first bent portion and the distal end, and
    wherein the first bent portion is formed to protrude in a contact direction between the at least one of the signal pin or the ground pin and a corresponding pin of the external electronic device for pressing contact against the corresponding pin when the external electronic device is connected to the electronic device, the second bent portion is formed to protrude in a direction opposite to the contact direction of the first bent portion, and the resistive material is disposed over an entirety of a portion of the at least one of the signal pin or the ground pin extending from between the first and second bent portions to the distal end.

7. The electronic device of claim 6, wherein the signal pin and the ground pin have same length.

8. The electronic device of claim 6, wherein the at least one of the signal pin or the ground pin is configured so that the resistive material first contacts the corresponding pin of the external electronic device as the external electronic device is connected to electronic device.

* * * * *